United States Patent [19]
Carter

[11] Patent Number: 5,305,784
[45] Date of Patent: Apr. 26, 1994

[54] TIRE INFLATION HOSE ASSEMBLY

[75] Inventor: Randall E. Carter, Waynesfield, Ohio

[73] Assignee: Precision Thermoplastic Components, Inc., Lima, Ohio

[21] Appl. No.: 44,737

[22] Filed: Apr. 12, 1993

[51] Int. Cl.$^5$ .................. F16K 15/20; B60C 29/00
[52] U.S. Cl. .................. 137/231; 137/223; 285/242; 285/305; 152/415
[58] Field of Search .............. 137/223, 231; 152/415; 285/242, 305, 403, 404, 420

[56] References Cited

U.S. PATENT DOCUMENTS

| | | | |
|---|---|---|---|
| 28,221 | 5/1860 | Warren | 285/403 |
| 52,214 | 1/1886 | Shore | 285/403 |
| 628,793 | 7/1899 | Griffin | 285/331 |
| 768,684 | 8/1904 | Parmley | 137/223 X |
| 1,442,933 | 1/1923 | Firpo | 137/231 |
| 1,492,838 | 5/1924 | Dilweg | 137/231 X |
| 1,607,353 | 11/1926 | Key et al. | 285/305 X |
| 1,721,518 | 7/1929 | Larzelere | 137/231 X |
| 2,227,607 | 1/1941 | O'Brien, Jr. | 152/415 |
| 2,237,559 | 4/1941 | Jenne | 152/415 X |
| 2,369,697 | 2/1945 | Werkenthin et al. | 285/242 |
| 2,663,348 | 12/1953 | Farris | 152/415 |
| 3,390,897 | 7/1968 | Moore | 285/305 X |
| 3,536,117 | 10/1970 | Huber | 137/223 X |
| 3,712,336 | 1/1973 | Bell, Jr. | 137/231 X |
| 3,913,954 | 10/1975 | Klimpl | 285/305 |
| 4,037,638 | 7/1977 | Mosca | 152/415 |
| 4,194,765 | 3/1980 | Reddy | 285/305 X |
| 4,269,312 | 5/1981 | Bressler | 137/223 X |
| 4,318,639 | 3/1982 | Schosek | 285/242 |
| 4,363,505 | 12/1982 | Smith | 285/404 X |
| 4,535,938 | 8/1985 | Lindabury, Sr. | 285/404 X |
| 4,923,350 | 5/1990 | Hinksman et al. | 285/305 X |

Primary Examiner—John Rivell
Attorney, Agent, or Firm—Killworth, Gottman, Hagan & Schaeff

[57] ABSTRACT

A tire inflation hose assembly for interconnecting a container of pressurized tire inflation material and a valve stem of a tire is provided. The hose assembly includes a release valve assembly for coupling to the container and for releasing the pressurized material contained therein. A flexible tube transports the released material to a nozzle which is adaptable for mating with the valve stem of the tire such that the pressurized material enters the tire when released by the release valve assembly. A pair of transverse pins secure the tube to the nozzle and the release valve assembly.

7 Claims, 3 Drawing Sheets

TIRE INFLATION HOSE ASSEMBLY

BACKGROUND OF THE INVENTION

The present invention relates generally to emergency tire inflation apparatuses and, more particularly, to a tire inflation hose assembly for interconnecting a portable container of pressurized tire inflation material and a conventional valve stem of a tire which is capable of withstanding the elevated material pressure required when using environmentally safe propellants.

Emergency tire repair systems which employ a portable container of highly pressurized inflation material to inflate a flat tire are very popular in today's automobile dependent society. The emergency tire inflation container has a sufficient quantity and mixture of materials, typically an inflation gas and a rubber type compound, to both inflate and repair a flat tire. Thus, a driver, upon experiencing a flat tire, can inflate the tire using the emergency tire repair system and have the tire checked later by a qualified tire professional.

A problem experienced with previous hose assembly designs is the unintentional uncoupling of the nozzle or release valve from the flexible tube due to the pressure of the inflation material. This problem has been exacerbated in recent years as manufactures have switched to environmentally safe propellants. Previous propellants, such as propane, butane and freon, were capable of operation at pressures of approximately 55 to 60 pounds per square inch. The current environmentally safe propellants require significantly higher pressures, pressures which can reach 160 to 170 pounds per square inch when the emergency tire repair system is stored in an automobile trunk and subjected to elevated temperatures.

Prior tire inflation hose assemblies have not been designed to withstand these increased pressures. For instance, previous hose assemblies have secured the flexible tube to the nozzle and release valve using an extended member having oversized, circumferential ribs. The extended member is inserted into the flexible tube, thereby stretching the tube and generating a holding force which opposes withdrawal of the member. In addition, a rigid annular sleeve having an inner diameter slightly larger than the outer diameter of the tube may be forced over the stretched portion of the tube to provide an even greater holding force.

However, these forces may be insufficient to withstand the aforementioned increased pressures, causing the emergency tire inflation apparatus to malfunction. Such a malfunction not only results in inconvenience and loss of time, and is highly undesirable.

Accordingly, there is a need in the art for an improved tire inflation hose assembly having an extended, flexible nozzle which is capable of withstanding the high pressures required when using environmentally safe propellants.

SUMMARY OF THE INVENTION

This need is met by the tire inflation hose assembly of the present invention which includes a release valve assembly for releasing the pressurized tire inflation materials from a container and a nozzle for injecting the pressurized material into a tire. A flexible tube transports the released material from the release valve assembly to the nozzle. A pair of transverse pins secure the flexible tube to the release valve assembly and the nozzle.

In accordance with one aspect of the present invention, a tire inflation hose assembly for interconnecting a container of pressurized tire inflation material and a valve stem of a tire comprises a release valve assembly for releasing the pressurized material from the container. A transport means, which is preferably a flexible tube, transports the pressurized material from the release valve assembly to a nozzle means. The nozzle means interconnects the transport means and the valve stem such that the pressurized material enters the tire when the release valve assembly is activated to release the pressurized material. A first pin transversing the release valve assembly and the transport means secures the transport means to the release valve assembly.

Preferably, a second pin transverses the transport means and the nozzle means to secure the nozzle means to the transport means. Additionally, the release valve assembly may comprise attachment means for mounting the release valve assembly on the container, a release valve for releasing the pressurized material from the container, and valve connector means, preferably having a plurality of circumferential ribs thereon, for coupling the transport means to the release valve assembly. A first pin transverses the valve connector means to secure the transport means to the release valve assembly.

The first pin may comprise a body for transversing the release valve assembly and the transport means. A head, which may be adjacent the body, restricts the insertion depth of the body into the release valve assembly and the transport means. Similarly, the second pin may comprise a body for transversing the transport means and the nozzle means and a head, which is adjacent the body, for restricting the insertion depth of the body into the transport means and the nozzle means. Alternatively, the first or second pin may comprise a plurality of leg members for transversing the transport means and the release valve assembly. A crossmember interconnects the plurality of leg members.

The nozzle means may preferably comprise a tire release valve assembly for mating with the valve stem of the tire and nozzle connector means, which may have a plurality of circumferential ribs thereon, for coupling the tire release valve assembly to the transport means.

In accordance with another aspect of the present invention, a tire inflation hose assembly for interconnecting a container of pressurized tire inflation material and a valve stem of a tire comprises a release valve assembly for securing the hose assembly to the container and for releasing the pressurized material from the container. A transport means transports the pressurized material from the release valve assembly to nozzle means. The nozzle means interconnects the transport means and the valve stem whereby the pressurized material enters the tire when the release valve assembly is activated to release the pressurized material. A pin transverses the transport means and the nozzle means for securing the nozzle means to the transport means.

It is thus a feature of the present invention to provide a tire inflation device which can withstand the increased material pressure needed when using environmentally safe propellants.

Other features and advantages of the invention will be apparent from the following description, the accompanying drawings and the appended claims.

DETAILED DESCRIPTION OF THE INVENTION

Figure 1:
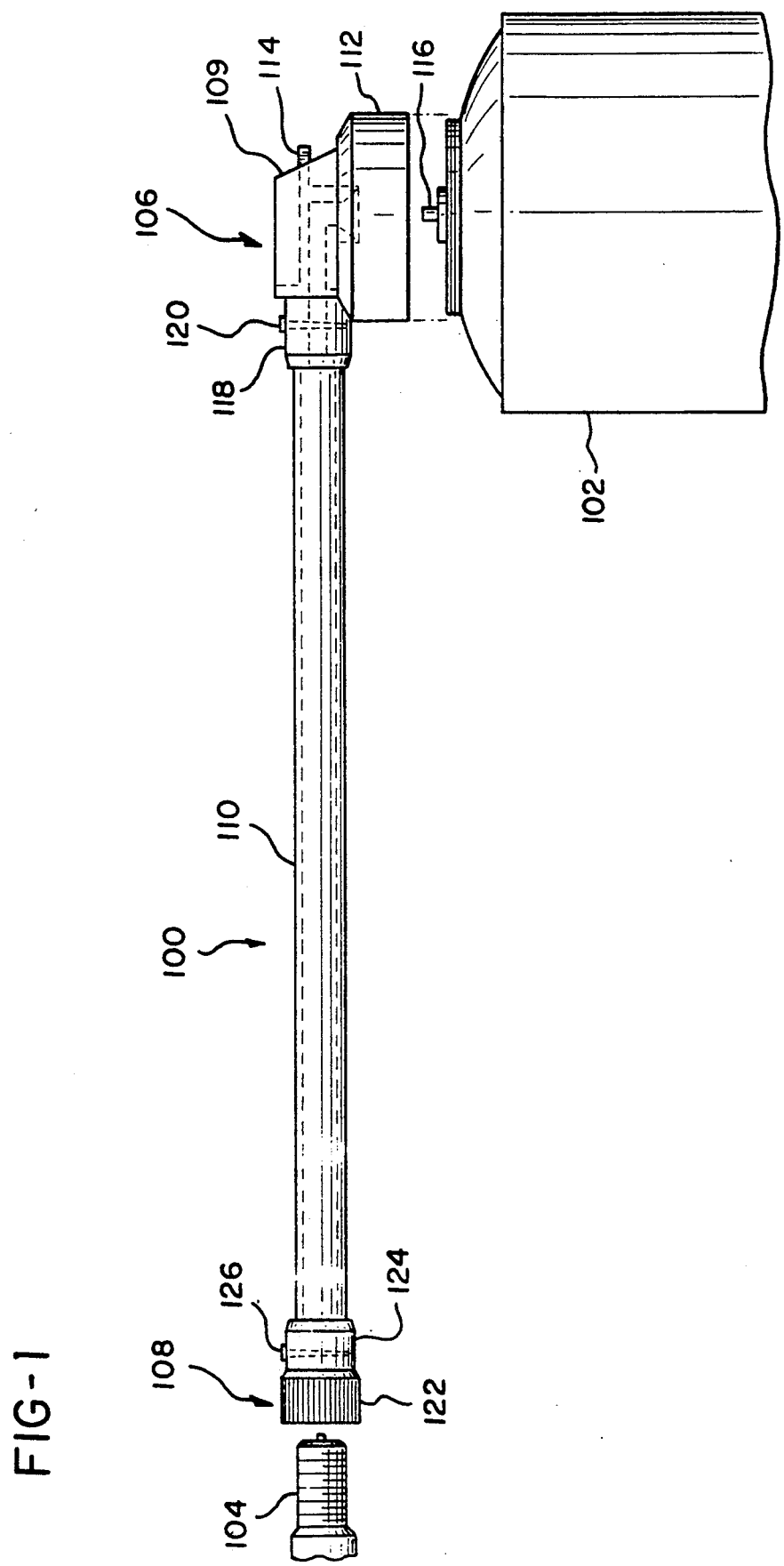
FIG. 1 is a side view of a tire inflation hose assembly having a flexible tube connected to a nozzle and a release valve assembly via a pair of transverse pins in accordance with the present invention.

A tire inflation hose assembly 100 for connecting a container 102 of pressurized tire inflation material to a conventional tire valve stem 104 is illustrated in FIG. 1. The hose assembly 100 includes a release valve assembly 106, adapted to be coupled to the container 102, for releasing the pressurized material, a nozzle 108 for connecting to the tire valve stem 104 and a flexible tube 110 for transporting the released material from the release valve assembly 106 to the nozzle 108.

The release valve assembly 106 includes a body, generally designated at 109, having an attachment means, shown as a housing 112, which can be removably mounted on the container 102 in a well known manner. When a downward force is applied to a release valve, such as a lever 114, an exit tube 116 of the container 102 is concomitantly forced downward to release the pressurized material contained therein. The released material then travels from the release valve assembly 106 into the tube 110.

Figure 2:
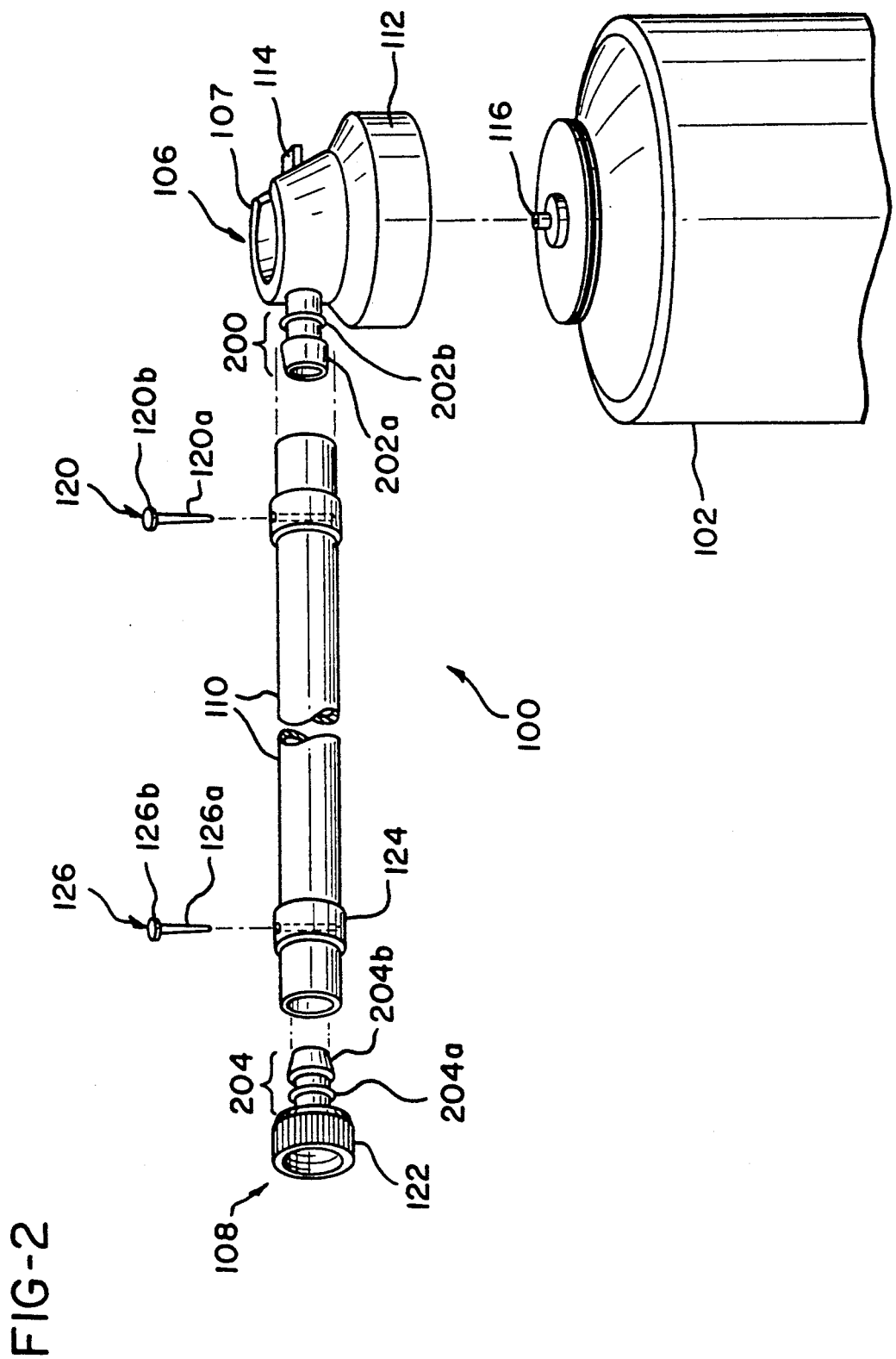
FIG. 2 is an exploded side view of the tire inflation hose assembly of FIG. 1.

The attachment of the tube 110 to the release valve assembly 106 is more conveniently described with reference to FIG. 2. An extended member 200, which extends from the release valve assembly 106, is inserted into one end of the flexible tube 110. The extended member 200 has a pair of circumferential ridges 202a and 202b thereon which enlarge the inner diameter of the tube 110 when inserted therein. This enlarging of the flexible tube 110 tends to secure the flexible tube 110 on the member 200. Ridge 202a may be slightly fastigiated to facilitate insertion of the extended member 200 into the tube 110.

A first annular sleeve 118 is mounted on the tube 110. The sleeve 118 has an inner diameter slightly greater than the outer diameter of the tube 110 and may have ridges on its inner surface which are positioned so as to interlock with the ridges 202a and 202b when the sleeve 118 is superimposed on the member 200, as is shown more clearly in FIG. 3. After the extended member 200 is inserted into the tube 110, the sleeve 118 is forced over the portion of the tube 110 accepting the extended member 200. Consequently, the sleeve 118 assists in securing the tube 110 to the member 200 by restricting further expansion of the tube 110 which is generally necessary to withdraw the member 200.

Extended member 200, tube 110 and sleeve 118 each have transverse apertures which can be aligned when the aforesaid elements are superimposed in accordance with the above description. A pin 120 for securing the tube 110 to the extended member 200 has a body 120a for transversing the tube 110, sleeve 118, and member 200 and a head 120b for restricting the insertion depth of the pin 120. The pin 120 is inserted into the aligned apertures and, consequently, prohibits the separation of the tube 110 from the release valve assembly 106. Moreover, the pin 120 provides a sufficient securing force to overcome the aforementioned increased material pressure required when using environmentally safe propellants.

The nozzle 108 is connected to the tube 110 at the end opposite the release valve assembly 106. The nozzle 108 includes a tire release valve 122 for mating with the conventional tire valve stem 104 and an extended member 204 for coupling with the tube 110. A number of structures which mate with a tire valve stem to allow the transfer of materials or gases, such as air, into or out of a tire are known in the art and may be advantageously employed in the present invention. Therefore, the structure and philosophy of the tire release valve 122 will not be further described herein.

The extended member 204 has a pair of circumferential ridges 204a and 204b thereon which enlarge the inner diameter of the tube 112 when the member 204 is inserted therein. As stated above with respect to extended member 200, this enlarging of the tube 110 tends to secure the member 202 in the tube 110. Ridge 204a may be slightly fastigiated to facilitate insertion of the member 204 into the tube 110.

A second annular sleeve 124 is mounted on the tube 110 to secure the member 204 in the tube 110. The inner diameter of the sleeve 124 is slightly greater than the outer diameter of the tube 110. The sleeve 124 is forced over the portion of the tube 110 enlarged by insertion of the member 204 to restrict the further expansion of the tube 110 and thus oppose withdraw of the member 204.

Similar to the coupling of the tube 110 to the release valve assembly 106, the tube 110, member 204 and sleeve 124 have transverse apertures formed therein which align upon superimposing the respective elements in accordance with the above discussion. A pin 126 is provided having a body 126a for transversing the sleeve 124, tube 110 and member 204 and a head 126b for restricting the insertion depth of the pin 126. It should be apparent that pin 126 may consist solely of body 126a. The insertion depth of the pin 126 would then be controlled during the assembly process of the hose assembly 100. The pin 126 is transversely disposed in the aligned apertures to couple the elements.

Figure 3:
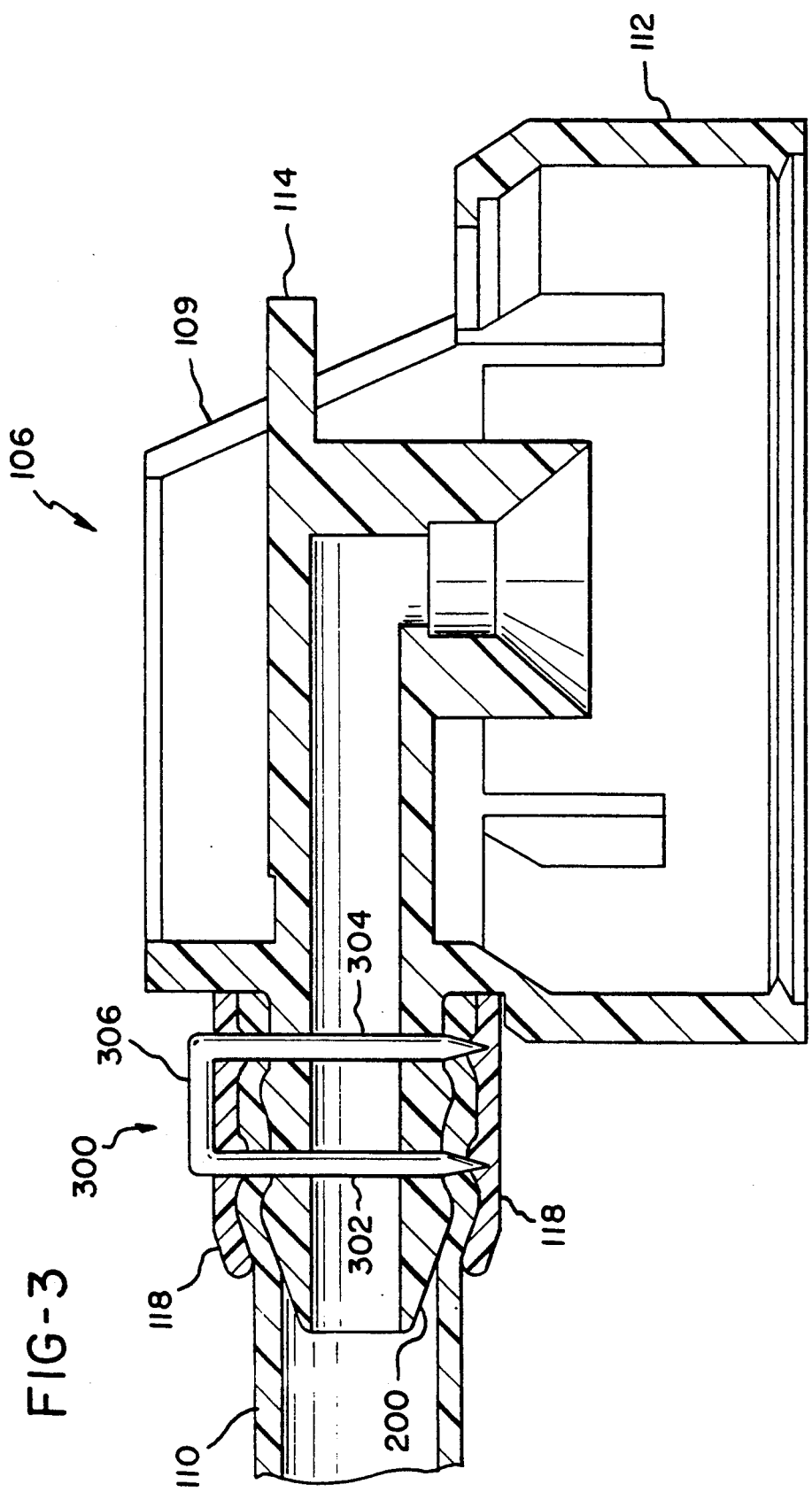
FIG. 3 shows an alternative pin configuration wherein the pin has a plurality of leg members.

An alternative pin 300 configuration is illustrated in FIG. 3. Although the alternative pin configuration is shown connecting the tube 110 to the release valve assembly 106, it should be understood that the alternative pin configuration may also be similarly employed to connect the tube 110 to the nozzle 108. The pin 300 has a pair of leg members 302 and 304 for transversing the sleeve 118, tube 110 and extended member 200. A crossmember 306 interconnects the respective leg members 302 and 304. In this embodiment, the sleeve 118, tube 110 and extended member 200 have a pair of transverse apertures for accepting the respective pair of leg members 302 and 304. As should be readily apparent to those skilled in the art, any number of leg members and corresponding transverse apertures may be advantageously employed in accordance with the present invention.

Having thus described the tire inflation hose assembly for interconnecting a container of pressurized tire inflation material and a conventional valve stem of a tire of the present invention in detail and by reference to preferred embodiments thereof, it will be apparent that modifications and variations are possible without departing from the scope of the inventions defined in the appended claims.

What is claimed is:

1. A tire inflation hose assembly for interconnecting a container of pressurized tire inflation material and a valve stem of a tire, said hose assembly comprising:
   a release valve assembly for securing said hose assembly to said container and for releasing said pressurized material from said container;
   transport means for transporting said pressurized material from said release valve assembly;
   a first sleeve mounted on said transport means;
   a first pin transversing said release valve assembly, said sleeve and said transport means for coupling said transport means, said first sleeve and said release valve assembly;
   nozzle means for interconnecting said transport means and said valve stem whereby said pressurized material enters said tire when said release valve assembly releases said pressurized material;
   a second sleeve mounted on said tube; and
   a second pin transversing said transport means, said second sleeve and said nozzle means for coupling said nozzle means, said second sleeve and said transport means.

2. The tire inflation hose assembly as recited in claim 1 wherein said transport means is a flexible tube.

3. The tire inflation hose assembly as recited in claim 1 wherein said first pin comprises:
   a body for transversing said release valve assembly and said transport means; and
   a head adjacent said body for restricting the insertion depth of said body into said release valve assembly and said transport means.

4. The tire inflation hose assembly as recited in claim 1 wherein said first pin comprises:
   a plurality of leg members for transversing said transport means and said release valve assembly; and
   a crossmember for interconnecting said plurality of leg members.

5. The tire inflation hose assembly as recited in claim 4 wherein said second pin comprises:
   a body for transversing said release valve assembly and said transport means; and
   a head adjacent said body for restricting the insertion depth of said body into said release valve assembly and said transport means.

6. The tire inflation hose assembly as recited in claim 1 wherein said nozzle means comprises:
   tire release valve being capable of connecting said nozzle means to said valve stem of said tire; and
   nozzle connector means for coupling said tire release valve to said transport means, said nozzle connector means being transversed by said pin.

7. The tire inflation hose assembly as recited in claim 6 wherein said nozzle connector means has a plurality of circumferential ribs thereon.

* * * * *